(No Model.)

T. S. DRUMMOND.
CHANGEABLE GEAR FOR BICYCLES.

No. 584,630. Patented June 15, 1897.

WITNESSES:

INVENTOR
T. S. Drummond
BY
ATTORNEYS.

UNITED STATES PATENT OFFICE.

THOMAS S. DRUMMOND, OF PUNXSUTAWNEY, PENNSYLVANIA, ASSIGNOR TO HIMSELF AND GEORGE E. ZEIGLER, OF SAME PLACE.

CHANGEABLE GEAR FOR BICYCLES.

SPECIFICATION forming part of Letters Patent No. 584,630, dated June 15, 1897.

Application filed June 1, 1896. Serial No. 593,843. (No model.)

*To all whom it may concern:*

Be it known that I, THOMAS S. DRUMMOND, of Punxsutawney, in the county of Jefferson and State of Pennsylvania, have invented a new and Improved Changeable Gear for Bicycles, of which the following is a full, clear, and exact description.

This invention relates to certain improvements in changeable gear for bicycles and similar vehicles, and has for its object to provide a gear of a simple and inexpensive construction which shall be adapted to be conveniently and quickly adjusted so as to permit of driving the vehicle forward either at a high speed when traveling over a level or slightly-inclined ground or at a low speed and with a greater application of power when the vehicle is traveling uphill.

The invention consists in a gear comprising gear-wheels fixed on the crank-shaft of the driving-wheel of the vehicle, tubular runways extending between and encircling the gear-wheels and adapted to receive balls, said runways being provided with openings whereby the teeth of the gears enter in position to engage the balls, and means for moving the runways so as to place either of them into or out of driving position.

The invention also contemplates certain novel features in the construction, combination, and arrangement of the various parts of the improved gear, whereby certain important advantages are attained, and the device is made simpler, cheaper, and otherwise better adapted and more convenient for use than various other similar devices heretofore employed, all as will be hereinafter fully set forth.

The novel features of the invention will be carefully defined in the claims.

Reference is to be had to the accompanying drawings, forming a part of this specification, in which similar characters of reference indicate corresponding parts in all the views.

Figure 1:
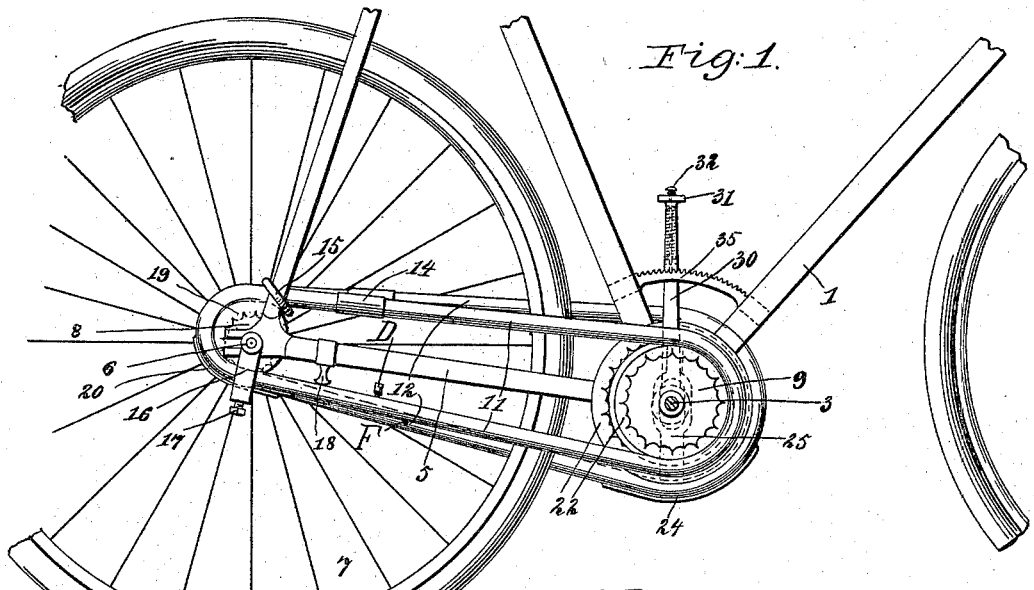
Figure 2:
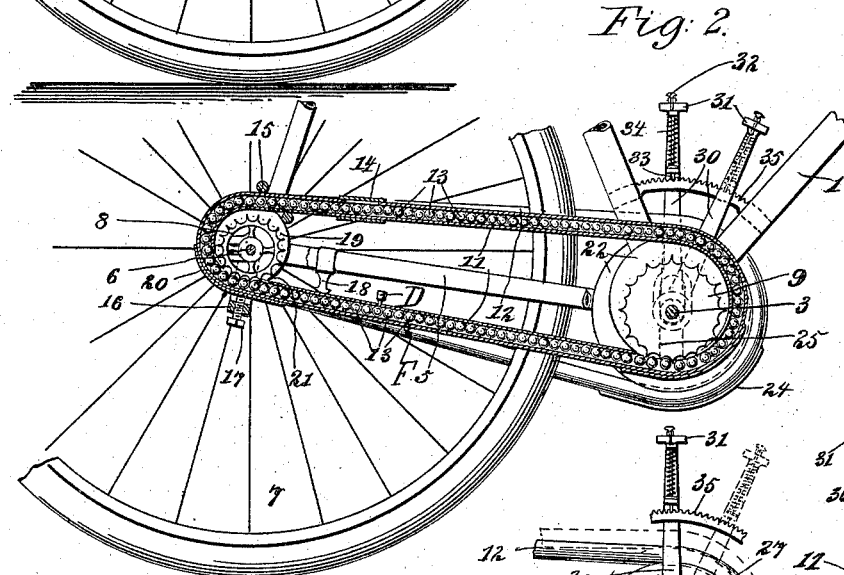
Figures 3, 4:
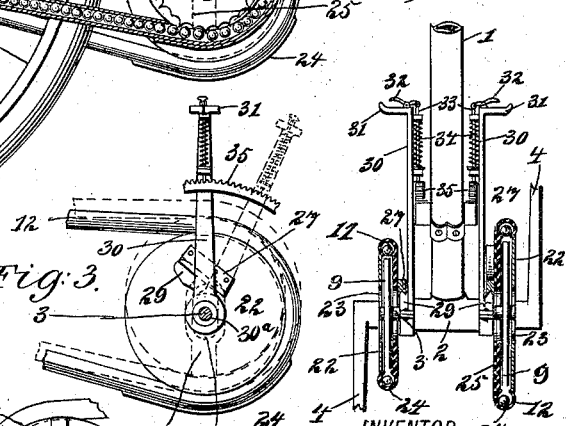
Figures 5, 6:
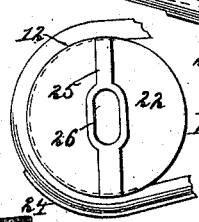

Figure 1 is a fragmentary side view showing portions of the frame and wheels of a bicycle provided with a gear constructed in accordance with my invention. Fig. 2 is a view somewhat similar to Fig. 1, but showing one of the runways in longitudinal section. Fig. 3 is a fragmentary sectional view taken through the crank-axle between the gears at opposite ends thereof and showing the means for operating the runways to place the same into and out of driving position. Fig. 4 is a transverse section taken through the runways and showing the actuating devices for the same. Fig. 5 is a detached sectional view taken through one end portion of the runway; and Fig. 6 is a view somewhat similar to Fig. 3, but showing in elevation the opposite side of the runway.

In the views, 1 indicates the frame of a bicycle or equivalent vehicle, which may be of any construction, and 2 represents the crank-box at the lower portion of said frame, in which box is journaled a crank shaft or axle 3, having at its opposite ends pedal-cranks 4, provided with pedals in the usual way to be operated by the feet of the rider. The frame is provided with backstays 5, carrying at their rear ends the rear axle 6, whereon is mounted to turn the driving-wheel 7.

On opposite ends of the hub of the driving-wheel 7 are mounted gear-wheels 8, having pointed teeth separated by curved recesses, as clearly shown in the drawings, and on opposite ends of the crank shaft or axle 3 are mounted similar gear-wheels 9. The gear-wheels at opposite sides of the vehicle are alined with each other and will be differently proportioned, so that when the gears at one side are employed in driving the vehicle will be driven at a low speed and with considerable power, while when the gears at the opposite side of the frame are employed in driving the machine will be driven at a greater speed but with less power.

11 and 12 indicate the runways, each formed hollow or tubular in the shape of an elongated loop having its ends curved, as clearly shown in the drawings, and arranged to encircle the gears 8 and 9 at one side of the vehicle. In the hollows of the respective runways 11 and 12 are arranged balls 13 of diameters adapted to fit in circular recesses between the teeth of the gear-wheels 8 and 9, and said runways are provided with apertures closed by sliding sleeves 14 in their upper portions, whereat the balls 13 may be inserted and removed.

Each runway is supported at its rear upper part by means of a clip or loop 15, encircling it and the adjacent rear fork of the vehicle-frame, and on the axle 6 of the driving-wheel 7 is arranged a depending bracket 16, having its lower portion arranged to pass beneath the rear end of the adjacent runway, said lower portion of the bracket being provided with a screw 17, arranged to bear under the runway, so as to support the same at a proper elevation. On each of the back stays 5 of the vehicle-frame is arranged a depending lug or finger 18, adapted to engage the upper surface of the lower run of the adjacent runway for purposes to be hereinafter explained.

The rear bent portion of each of the runways is provided at opposite sides with circular plates 19, extending on opposite sides of the gear-wheels 8, and the under side of each of the respective runways is provided with a reinforce 20, against which the screw 17 is arranged to bear. In the upper surface of the rear portion of the lower run of each of the runways 11 and 12 is formed an opening 21 to receive the periphery of the corresponding gear-wheel 8, so that the teeth of said wheel may be in engagement with the balls 13, inside the runway.

The forward bent end of each of the runways 11 and 12 is provided with circular plates 22, arranged at opposite sides of the respective gear-wheels 9, as clearly shown in Fig. 4, and each of said plates 22 is provided with an elongated or slotted opening 23, through which passes the crank shaft or axle 3, as indicated in Fig. 4. The under side of the forward end of each runway is also provided with a reinforce 24, similar to the reinforce 20 at the rear end of the runway.

On the outer plate 22 is secured a transversely-extending bar 25, having its central portion enlarged and perforated, as indicated at 26 in Fig. 6, to correspond with the perforations 23 in the plates 22, and on the inner plate 22 is arranged a projecting block or lug 27, having its lower edge or face inclined and longitudinally grooved or channeled, as clearly shown at 28 in Fig. 5, said grooved or channeled surface being adapted to receive a correspondingly-formed surface on a cam block or piece 29, carried on a lever 30, mounted to swing on a boss 30ª, projecting from the end of the crank-box.

Each lever 30 extends upwardly at one side of the frame and is provided with an overturned or bent upper end 31, projecting outwardly and forming a handle or enlargement to be engaged by the foot of the rider when it is desired to change the gear. On the inner side of each lever 30 are formed lugs perforated to receive a longitudinally-movable bolt 33, connected at its upper end with a pivoted lever or catch 32 and normally held by a spring 34, coiled upon it in engagement with the teeth of a curved rack-bar 35, secured to the frame, as shown in Figs. 1 and 2.

Each of the runways will be formed by preference of resilient or spring metal tubing, and the screw 17 and lug or finger 18 at the rear end thereof will be so arranged and adjusted that the forward end of the runway will be normally held slightly below and out of engagement with the corresponding gear-wheel 9 on the crank shaft or axle 3, as indicated in Fig. 1, and when one of the levers 30 is moved forward its cam-block 29 will engage under the block and projection 27 on the inner plate 22 of the corresponding runway, so as to lift the forward end of the runway and cause the teeth of the gear-wheel 9 at that end of the crank-shaft to pass through the opening in the upper surface of the lower run of the runway into engagement with the balls 13 therein.

As the crank-shaft and gear-wheel 9 thereon rotate, the balls 13 in the runway will be caused to travel along the same, so as to communicate the movement of the crank-shaft to the rear driving-wheel, as will be readily understood. When it is desired to change the gear, it is only necessary to swing or move the lever 30 rearwardly to the position shown in Fig. 1, so that the cam-block 29 will be withdrawn from under the block 27, whereupon the corresponding runway will move by its own resiliency downward to disengage the gear-wheel 9 from the balls therein. When this has been done, the other lever 30 is moved forward, so as to raise the forward end of the corresponding runway to bring the gear-wheel 9 at that end of the crank-shaft into engagement with the balls.

From the above description it will be seen that the invention is of an extremely simple and inexpensive nature and is especially well adapted for the purposes for which it is designed, since it permits the rider to quickly and conveniently change from a low to a high gear, or vice versa, and, furthermore, is capable of being readily repaired in case of damage; and it will also be obvious from the above description that the invention is susceptible of some modification without material departure from its principles and spirit, and for this reason I do not wish to be understood as limiting myself to the precise form and arrangement of the parts herein set forth.

I may provide each of the runways with a self-oiler D and a drip-valve F, as shown in Figs. 1 and 2.

Having thus described my invention, I claim as new and desire to secure by Letters Patent—

1. In a bicycle, the combination of a drive-shaft or crank-shaft having a gear-wheel, a supporting-wheel also provided with a gear-wheel, and a ball-containing runway made in the shape of a loop having curved ends encircling the gears, the runway having openings for the passage of the gear-wheels into and out of engagement with the balls, the space between the upper and lower runs of the said runway at the ends being of greater width than that of the respective gear-wheels, whereby the said gear-wheels when engaging the balls are arranged eccentrically to the curved ends of the runway, and mechanism under the control of the rider, whereby the said gear-wheels and balls may be brought into engagement with each other, substantially as described.

2. In a bicycle, the combination of a drive-shaft or a crank-shaft having a gear-wheel at each end, a supporting-wheel provided at each end of its hub with a gear-wheel, the gear-wheels at the opposite sides of the vehicle being alined with each other and differently proportioned for the purpose set forth, a runway encircling the gears at each side of the vehicle, each runway being provided with a hollow to receive a series of balls, said runways having openings for the passage of the gear-wheels into and out of engagement with the balls, the said gear-wheels and balls being normally out of engagement, and mechanism, whereby the gear-wheels and balls at either side of the vehicle may be brought into engagement, substantially as described.

3. In a bicycle, the combination of a crank-shaft having a gear-wheel, a driving-wheel also provided with a gear-wheel, a runway encircling the gears and provided with a hollow to receive a series of balls, said runway having openings for the passage of the gear-wheels into engagement with the balls, and means for moving the runway to cause one of the gear-wheels to pass through the opening into and out of engagement with the balls, substantially as set forth.

4. In a bicycle, the combination of a crank-shaft having a gear-wheel, a driving-wheel also provided with a gear-wheel, a runway encircling the gear-wheels and provided with a hollow to receive balls and having openings for the passage of the same into engagement with the balls, means for supporting the runway adjacent to one gear-wheel, and means for moving the runway pivotally at its other end to cause the gear at that end to pass through the opening into and out of engagement with the balls, substantially as set forth.

5. In a bicycle, the combination of a crank-shaft having a gear-wheel, a driving-wheel also provided with a gear-wheel, a hollow runway encircling the gear-wheels, balls arranged in the hollow of the runway, said runway being provided at its ends with openings for the passage of the gear-wheels into engagement with the balls, a support for the end of the runway adjacent to one gear-wheel, the opposite end of the runway being held by its resiliency with the adjacent gear-wheel out of engagement with the balls in the runway, and means, located adjacent to the last-mentioned end of the runway, for moving the runway to cause the adjacent gear to pass through the opening into engagement with the balls, substantially as set forth.

6. In a bicycle, the combination of a crank-shaft having a gear-wheel, a driving-wheel also provided with a gear-wheel, a runway encircling the gear-wheels and having a hollow to receive a series of balls, said runway being provided with openings for the passage of the gear-wheels into engagement with the balls, means to support one end of the runway with the adjacent gear-wheel in engagement with the balls, the other end of the runway being arranged to swing pivotally to cause the corresponding gear-wheel to pass through the opening into and out of engagement with the balls, and a lever pivoted adjacent to the swinging end of the runway and provided with a block to engage and move the runway, substantially as set forth.

7. In a bicycle, the combination of a crank-shaft having a gear-wheel, a driving-wheel also provided with a gear-wheel, a runway encircling the gear-wheels and having a hollow to receive balls, said runway being provided at its ends with openings for the passage of the gear-wheels into engagement with the balls, a support for one end of the runway, to hold said runway with the adjacent gear-wheel in engagement with the balls, the other end of the runway being arranged to swing pivotally to cause the corresponding gear-wheel to move into and out of engagement with the balls, a projection on the swinging end of the runway, and a lever pivoted adjacent to the swinging end of the runway and provided with a block to engage the projection and move the runway, substantially as set forth.

THOMAS S. DRUMMOND.

Witnesses:
IRA CARRIER,
HOMER C. BAIR.